(12) United States Patent
Liu et al.

(10) Patent No.: US 8,304,741 B2
(45) Date of Patent: Nov. 6, 2012

(54) RADIOACTIVITY MEASURING APPARATUS WITH ROTATING STAGE FOR WASTE DRUMS

(75) Inventors: Mao-Chen Liu, Taoyuan County (TW); Chung-Zen Lin, Taoyuan County (TW); Kuo-Jen Lin, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 342 days.

(21) Appl. No.: 12/820,261

(22) Filed: Jun. 22, 2010

(65) Prior Publication Data
US 2011/0042586 A1 Feb. 24, 2011

(30) Foreign Application Priority Data
Aug. 21, 2009 (TW) .............................. 98128145 A

(51) Int. Cl.
*G01T 1/20* (2006.01)
(52) U.S. Cl. ................................. 250/370.11
(58) Field of Classification Search ............ 250/370.01–370.15, 380
See application file for complete search history.

(56) References Cited

U.S. PATENT DOCUMENTS

| 4,777,367 A * | 10/1988 | Kawasaki et al. .......... 250/336.1 |
| 6,624,425 B2 * | 9/2003 | Nisius et al. .................. 250/393 |
| 6,791,093 B2 * | 9/2004 | Caldwell et al. .............. 250/395 |

FOREIGN PATENT DOCUMENTS
JP         02285279 A  * 11/1990
* cited by examiner

*Primary Examiner* — Kiho Kim
(74) *Attorney, Agent, or Firm* — WPAT PC.; Justin King

(57) ABSTRACT

A radioactivity measuring apparatus with a rotating stage for waste drums is provided, which includes a case, a plurality of radioactive counters, a rotation unit, and a control unit. The case has an opening and an accommodating space in communication with the opening. A shielding gate is connected to one side of the opening. The plurality of radioactive counters is disposed in the accommodating space, and used for detecting a radioactive counting associated with a sample. The rotation unit is disposed at a wall on a side of the shielding gate corresponding to the opening, and used for supporting the sample. The control unit is electrically connected to the rotation unit and the plurality of radioactive counters, and used for controlling the rotation unit to rotate by a control signal, so as to enable the sample to rotate within the accommodating space.

8 Claims, 9 Drawing Sheets

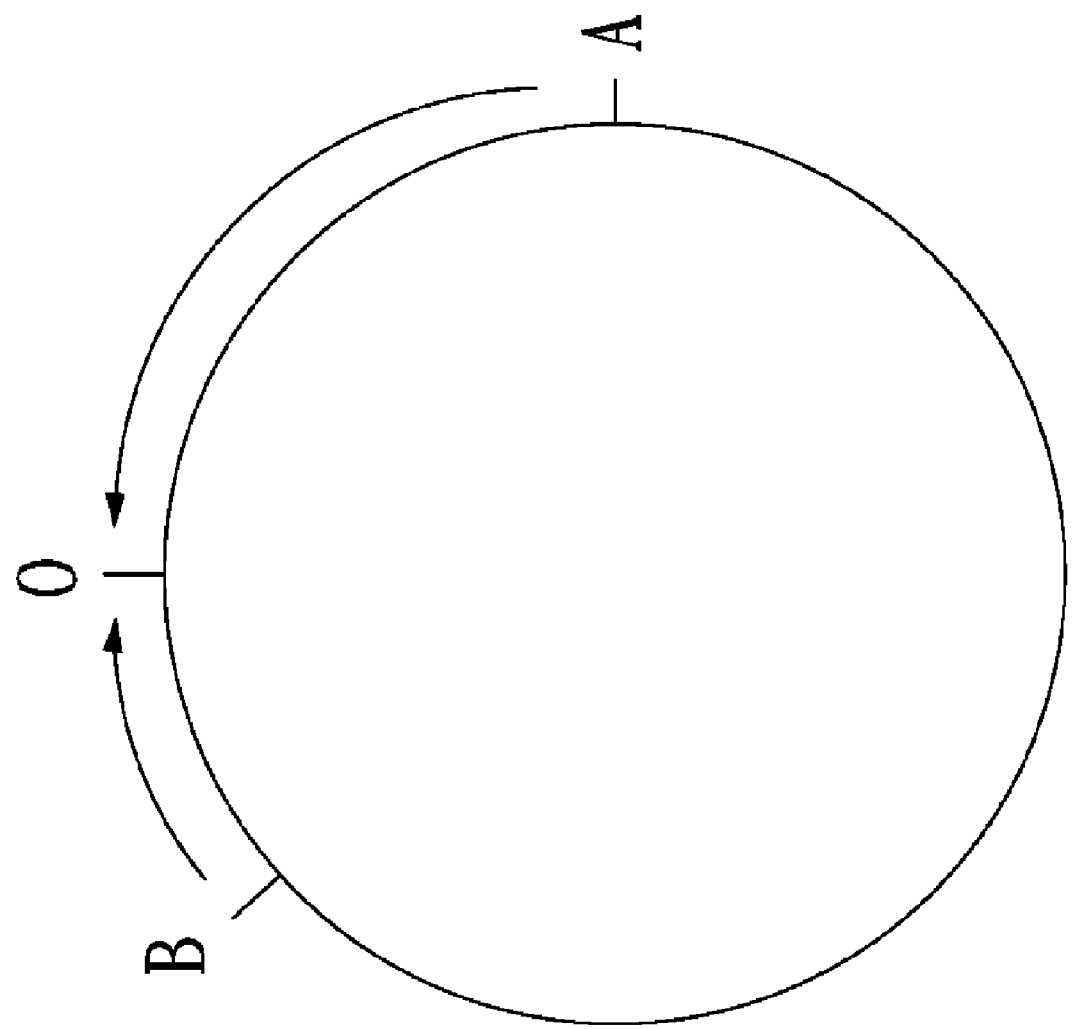

RADIOACTIVITY MEASURING APPARATUS WITH ROTATING STAGE FOR WASTE DRUMS

BACKGROUND OF THE INVENTION

1. Field of Invention

The present invention relates to a measuring apparatus, and more particularly to a radioactivity measuring apparatus with a rotating stage for waste drums, which is capable of rotating a sample and applied in contamination measurement for decommissioning wastes.

2. Related Art

Decommissioning wastes contain a large portion of ignorable trace-level radioactive solid wastes, which pose very little threat to the human body or the environment in terms of radioactive hazard. However, these solid wastes are quite a few and take a large proportion in the decommissioning wastes. Therefore, the International Atomic Energy Agency (IAEA) suggests that, the control on trace-level radioactive wastes should be released and these wastes are allowed to be disposed, recycled, or reused like the ordinary wastes. If no related deregulation code is formulated, or no legal release process or radioactive analysis tool is provided, it is impossible to release the control on the wastes, and the wastes must be treated like low-level radioactive wastes. In this case, the disposal cost is rather high, and efforts cannot be concentrated on other more hazardous wastes, which is rather uneconomical.

The waste disposal and deregulation technologies are developed to reduce demands for final treatment of nuclear wastes, and realize the reuse of decommissioning nuclear facilities, which is a major task for each country in decommissioning of nuclear facilities. Therefore, it is rather important to develop and establish an analysis release process and an analysis method for ignorable trace-level solid wastes. Proper detection and categorization of the decommissioning wastes can not only greatly reduce the generation of radioactive wastes to be stored, but also significantly reduce the expenditure and lower the public cost, so that the detection and categorization of the decommissioning wastes are necessary.

In order to achieve stage treatment and security management of the radioactive solid wastes, and greatly reduce the radioactive wastes to be stored, a whole set of decontamination equipment for treating radioactive contamination of metal wastes after disassembly needs to be established. In this equipment, a full solid radioactive waste activity measuring and preliminary screening system plays a rather important role, which is used for measuring a contaminant sample to determine a state of the sample.

FIG. 1A is a schematic view of a radioactive detection device in the conventional measuring system according to the prior art. The radioactive detection device 1 has a case 10. An opening 11 is disposed on a side surface of the case 10. The case 10 has a plurality of planar scintillation detectors 12 disposed therein. In the prior art, a sample 13 with radioactive contamination is to be measured, and the sample 13 is a cylindrical container with contaminant accommodated therein. The container is placed in an accommodating space of the case through complex automatic delivery (as shown in FIG. 1B) or manually for subsequent measurement. In FIG. 1B, the radioactive detection device 1a has a case 10, which is formed by lead shielding plates 100. An opening 101 is disposed on one side of the case 10. An automatic gate 102 is disposed on the opening. An automatic delivery device 14 is disposed on one side of the opening, and used for delivering radioactive waste drums to be measured into the case 10 for subsequent measurement. The conventional automatic delivery device 14 for counting is formed by rollers 16, so as to deliver the waste drums. The case 10 also has rollers 15 to receive and continue to carry the waste drums delivered by the automatic delivery device 14.

Although the conventional radioactive contamination measuring technology can be used to figure out the contamination state of the contaminant in the cylindrical container, it still has the following disadvantages.

1. Firstly, as shown in FIG. 1A, in the prior art, a sample needs to be placed in the case manually and is measured after the gate is shut, which not only wastes manpower but also increases the radioactive dose received by personnel in operation.

2. Further, as shown in FIG. 1B, in the prior art, the rollers 15 and a #-shaped lifting mechanism 17 are disposed in the case, which not only leads to a high mechanical cost but also reduces the measuring efficiency as the detectors below the sample are blocked by the rollers 15 and the lifting mechanism 17.

3. In addition, in the prior art, although the measuring apparatus (as shown in FIGS. 1A and 1B) can be fabricated into a six-surface enclosed structure, but its price rises by multiples with the increase of the width of the detector. As shown in FIG. 1C, generally, a cylinder has a diameter of 60.6 cm, and a conventional detector is 50 cm wide. Since the diameter of the cylinder exceeds the width of the detector, the radiation emitted from areas A1 to A4 cannot be detected by the detectors in all directions, so that the radioactive measurement is underestimated and is thus inaccurate.

4. Even if the position of an intensive radioactive contamination source is detected, as the contamination source may exist at any place in the cylinder, in the case that the contamination source does not exist at a position near the shielding gate, the measuring personnel still need to rotate the cylindrical container manually for easy labeling. As such, the operating process is added, and the operating time is prolonged.

In view of the above, a radioactivity measuring apparatus with a rotating stage for waste drums is needed urgently to solve the problems in the prior art.

SUMMARY OF THE INVENTION

The present invention is mainly directed to a radioactivity measuring apparatus with a rotating stage for waste drums, in which a mechanism capable of rotating a sample is disposed, so that the sample can be rotated during the measurement to obtain an accurate activity measurement value of a radioactive source, and a position of the radioactive source with the highest intensity in the sample can be rotated to a specific position for easy recognition of the personnel after the measurement, thereby achieving the purpose of rapid measurement and categorization and realizing the measurement of wastes at a high weight. Moreover, in the present invention, the supporting, loading, and rotation functions are integrated to greatly save the cost required by mechanical structures, the operating process is also facilitated, and the throughput is effectively increased. Moreover, as the mechanisms in the case are reduced, the problem that the detectors are blocked can be avoided, the detecting efficiency (cps/Bq) of the whole system is enhanced, and a minimum detectable amount (MDA) of the system activity is reduced.

The present invention is also directed to a radioactivity measuring apparatus with a rotating stage for waste drums, in which a rotating mechanism is disposed, so that the radiation of a sample can be effectively and uniformly distributed, and thus a uniform radioactive source is provided for detectors. Further, contamination spots of the sample within a range of 0° to 360° can definitely be detected by the detectors, thereby greatly improving the measuring precision in the case of non-uniform contamination spots and a large distribution gradient of high and low activities in the cylinder.

In order to achieve the above objectives, the present invention provides a radioactivity measuring apparatus with a rotating stage for waste drums, which includes a case, a plurality of radioactive counters, a rotation unit, and a control unit. The case has an opening and an accommodating space in communication with the opening. A shielding gate is connected to one side of the opening. The plurality of radioactive counters is disposed in the accommodating space, and used for detecting a radioactive counting associated with a sample. The rotation unit is disposed at a wall on a side of the shielding gate corresponding to the opening, and used for supporting the sample. The control unit is electrically connected to the rotation unit and the plurality of radioactive counters, and used for controlling the rotation unit to rotate by a control signal, so as to enable the sample to rotate within the accommodating space.

Preferably, the radioactive counter is a plastic scintillation counter.

Preferably, the rotation unit further includes a seat, connected to the shielding gate; a rotation driving device, disposed on the seat, and used for providing a rotation driving force; and a support disk, coupled to the rotation driving device, and used for supporting the sample and rotating under the rotation driving force. The support disk further has a weight sensing unit, electrically connected to the control unit, and used for detecting a weight of the sample. The support disk is further connected to an encoder via a coupling, and the encoder is used for recording a rotation angle of the support disk.

Preferably, the plurality of radioactive counters is disposed on an internal wall of the case.

BRIEF DESCRIPTION OF THE DRAWINGS

The present invention will become more fully understood from the detailed description given herein below for illustration only, and thus are not limitative of the present invention, and wherein:

FIG. 7 is a schematic view of a forward and reverse rotation mechanism of the rotation unit.

DETAILED DESCRIPTION OF THE INVENTION

In order to make the characteristics, objectives, and functions of the present invention comprehensible to the examiner, some detailed structures of the system and the design concept of the present invention are illustrated below, so that the examiner may understand the features of the present invention.

Figure 1A:
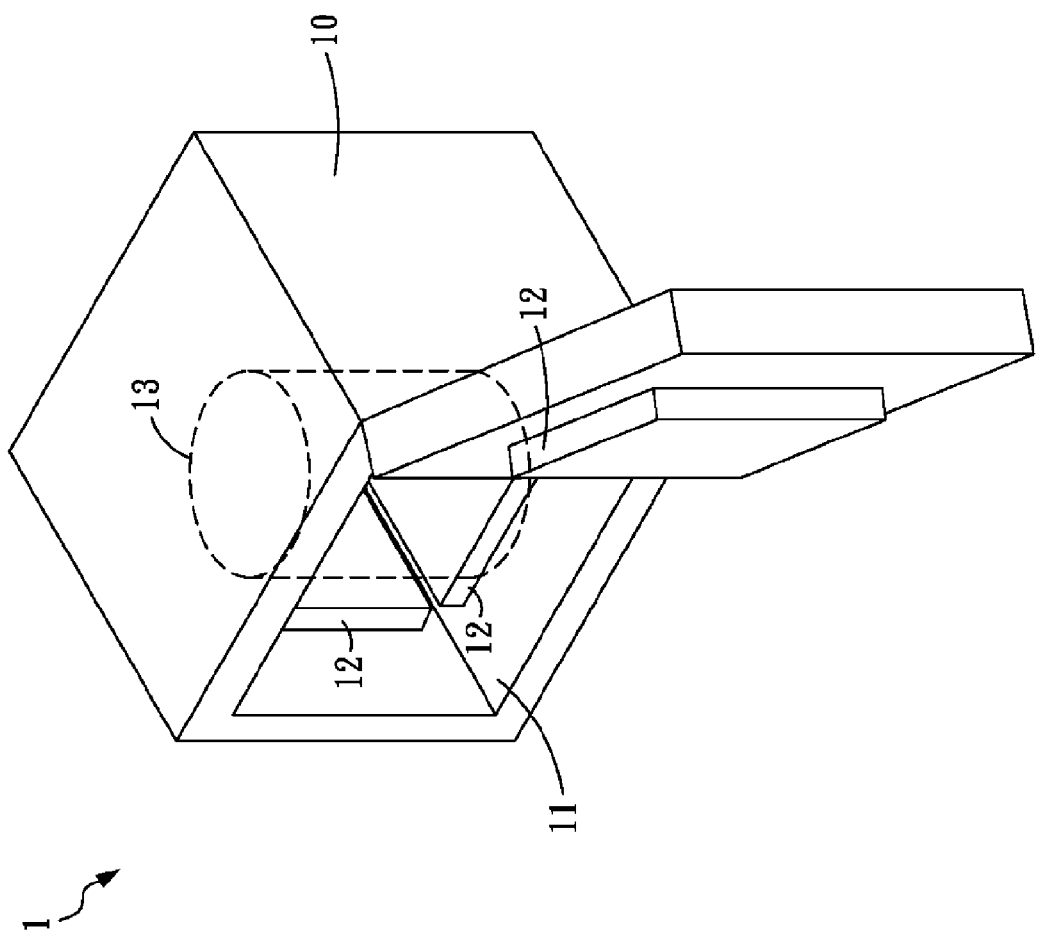
FIGS. 1A and 1B are schematic views of a radioactive detection device in the prior art.
Figure 1B:
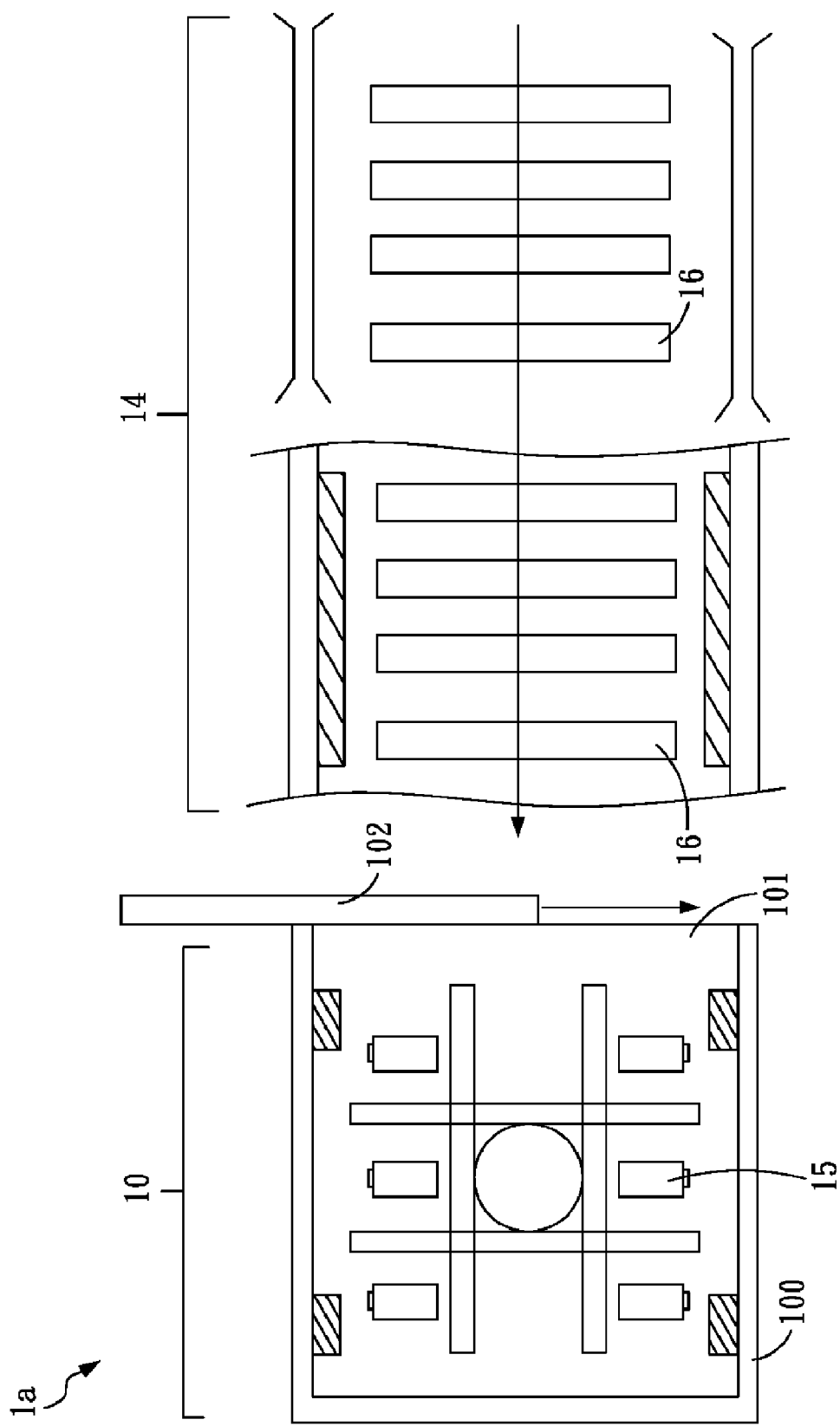
Figure 1C:
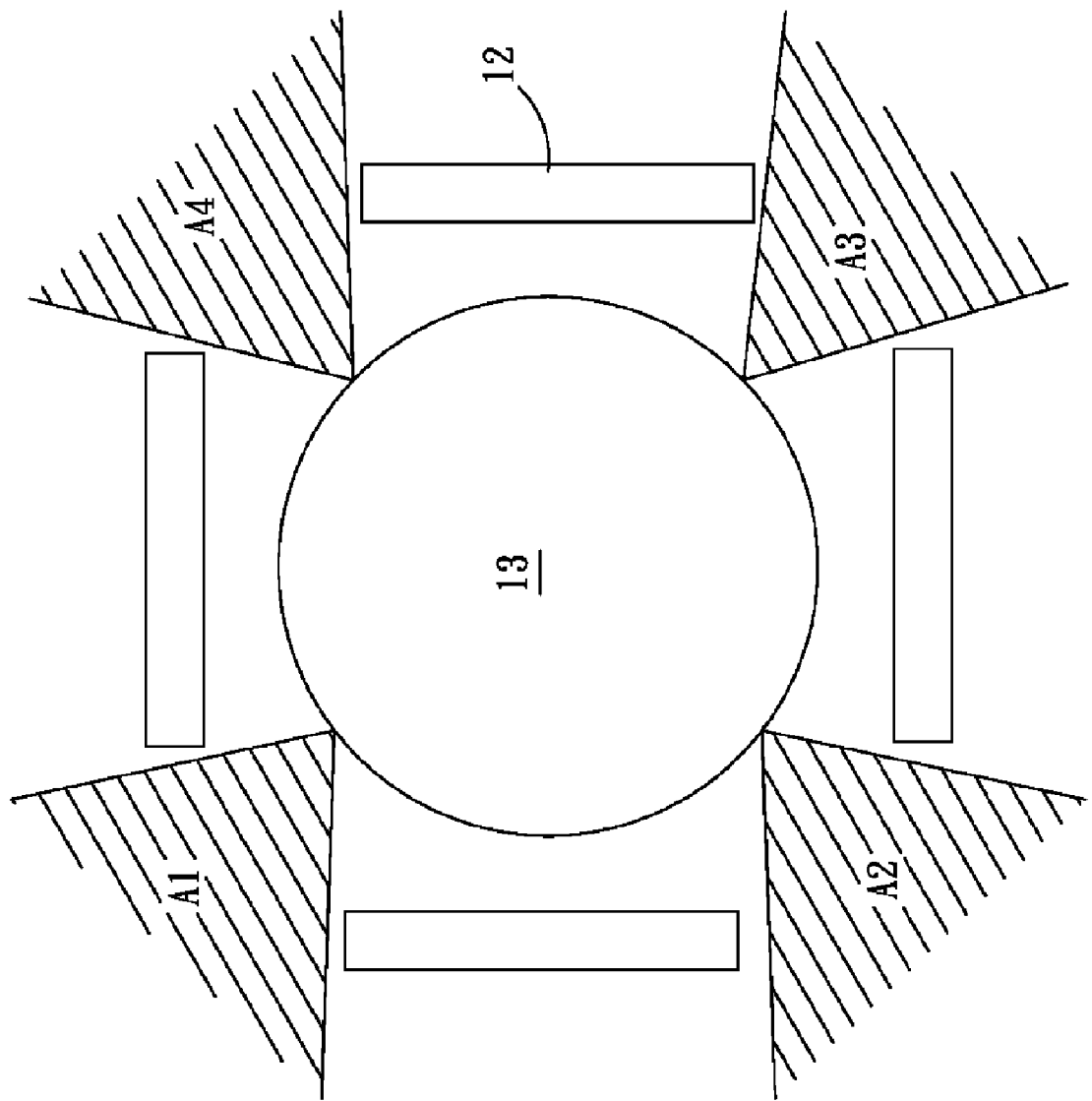
FIG. 1C is a schematic view of areas that cannot be measured by the radioactive detection device in the prior art.
Figure 2:
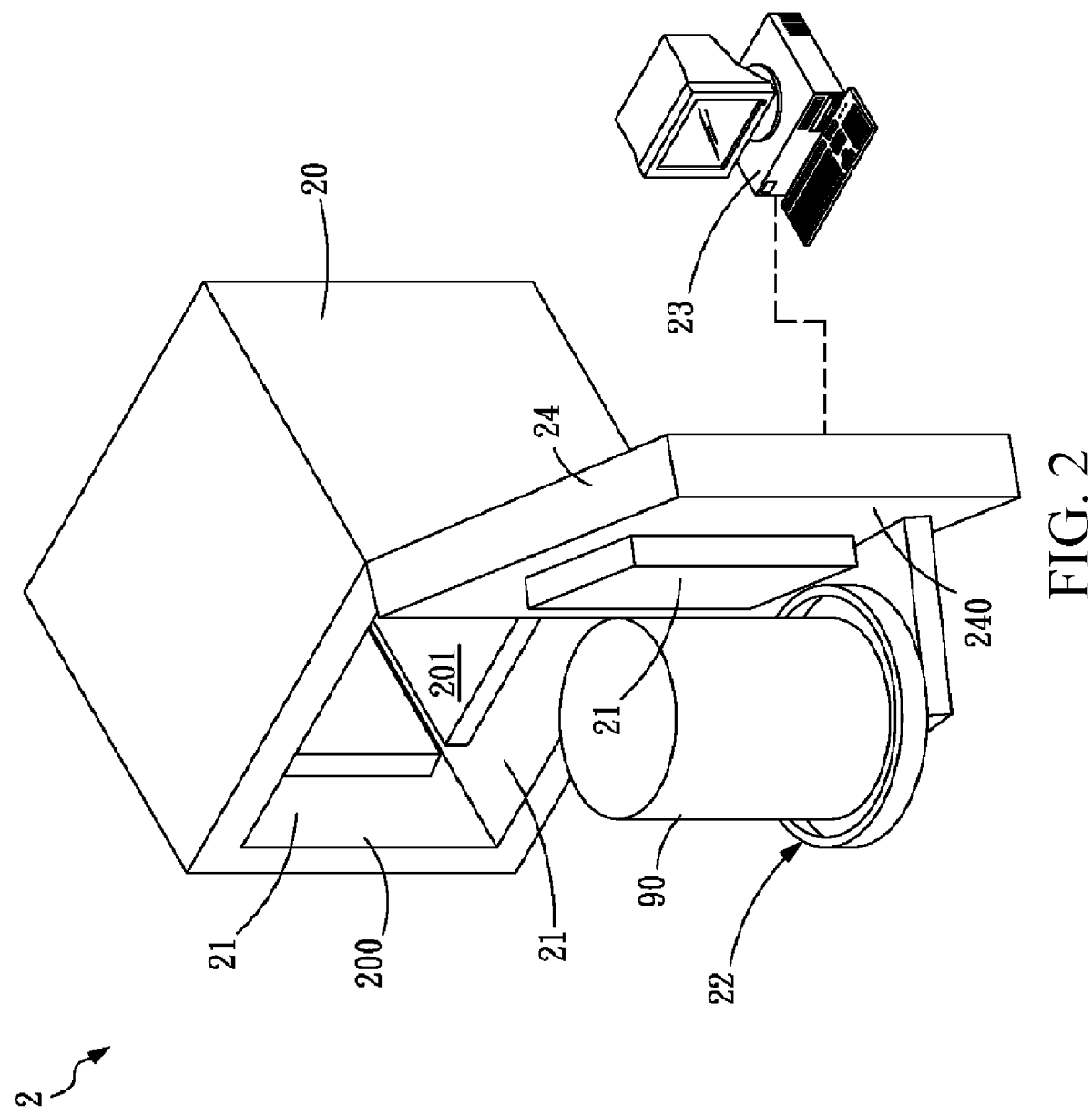
FIG. 2 is a schematic three-dimensional view of a radioactivity measuring apparatus with a rotating stage for waste drums according to an embodiment of the present invention.
Figure 3:
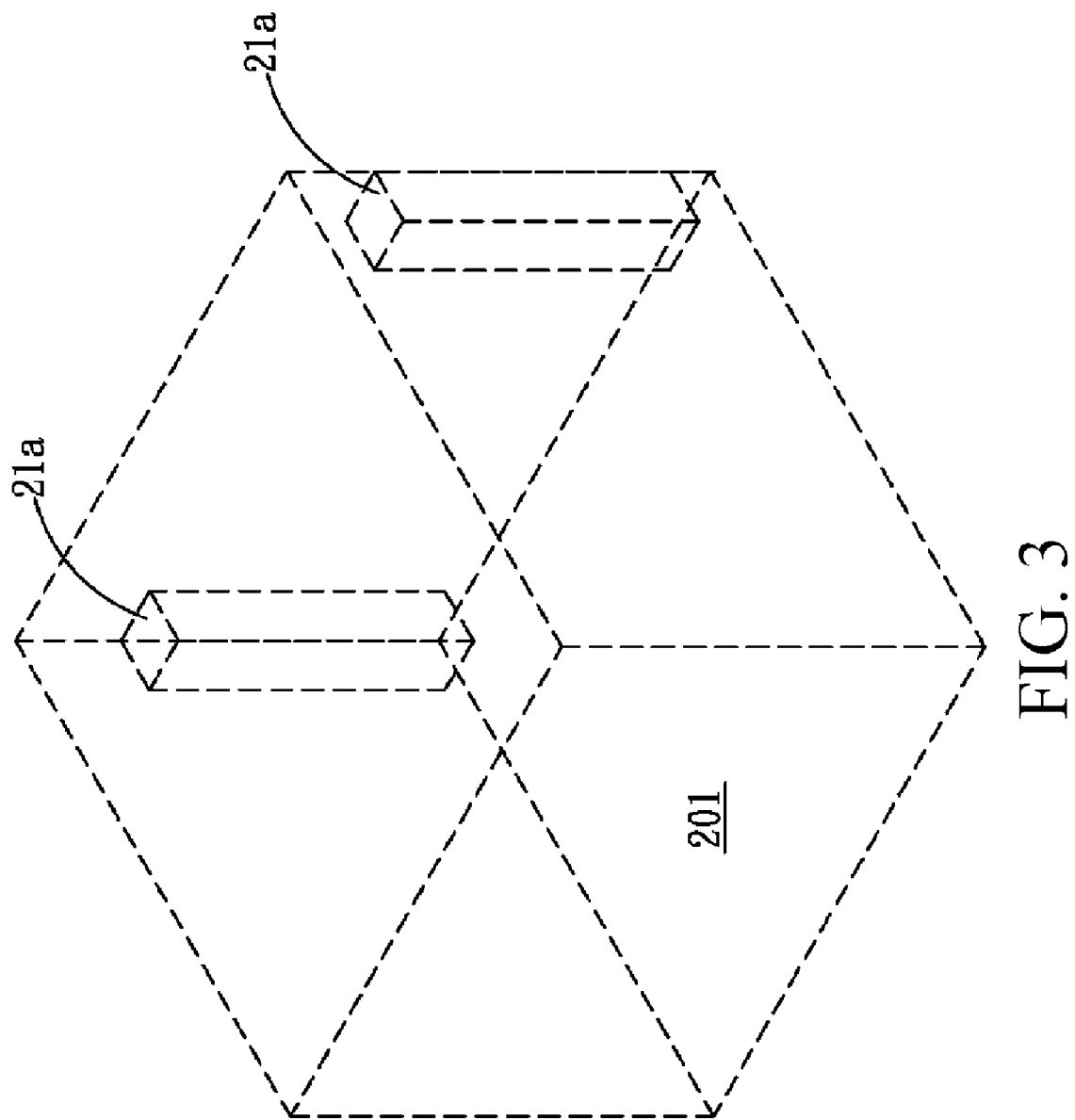
FIG. 3 is a schematic view of disposed positions of radioactive counters according to the present invention.

FIG. 2 is a schematic three-dimensional view of a radioactivity measuring apparatus with a rotating stage for waste drums according to an embodiment of the present invention. In this embodiment, the radioactivity measuring apparatus with a rotating stage for waste drums 2 includes a case 20, a plurality of radioactive counters 21, a rotation unit 22, and a control unit 23. The case 20 has an opening 200 and an accommodating space 201 in communication with the opening 200. A shielding gate 24 is connected to one side of the opening 200. The plurality of radioactive counters 21 is disposed in the accommodating space 201, and each radioactive counter 21 is used for detecting a radioactive counting associated with a sample 90. In this embodiment, the radioactive counter 21 is, but not limited to, a planar plastic scintillation counter. The radioactive counters 21 may be disposed at positions on the top of, at the bottom of, on the left side of, on the right side of, in the front of, and at the back of the accommodating space 201, and may even be disposed at positions as shown in FIG. 3, in which the radioactive counters 21a are disposed in the corners of the accommodating space 201, so as to accurately measure the radioactive counting of the sample 90, thereby determining a possible position of a radioactive source.

Figure 4:
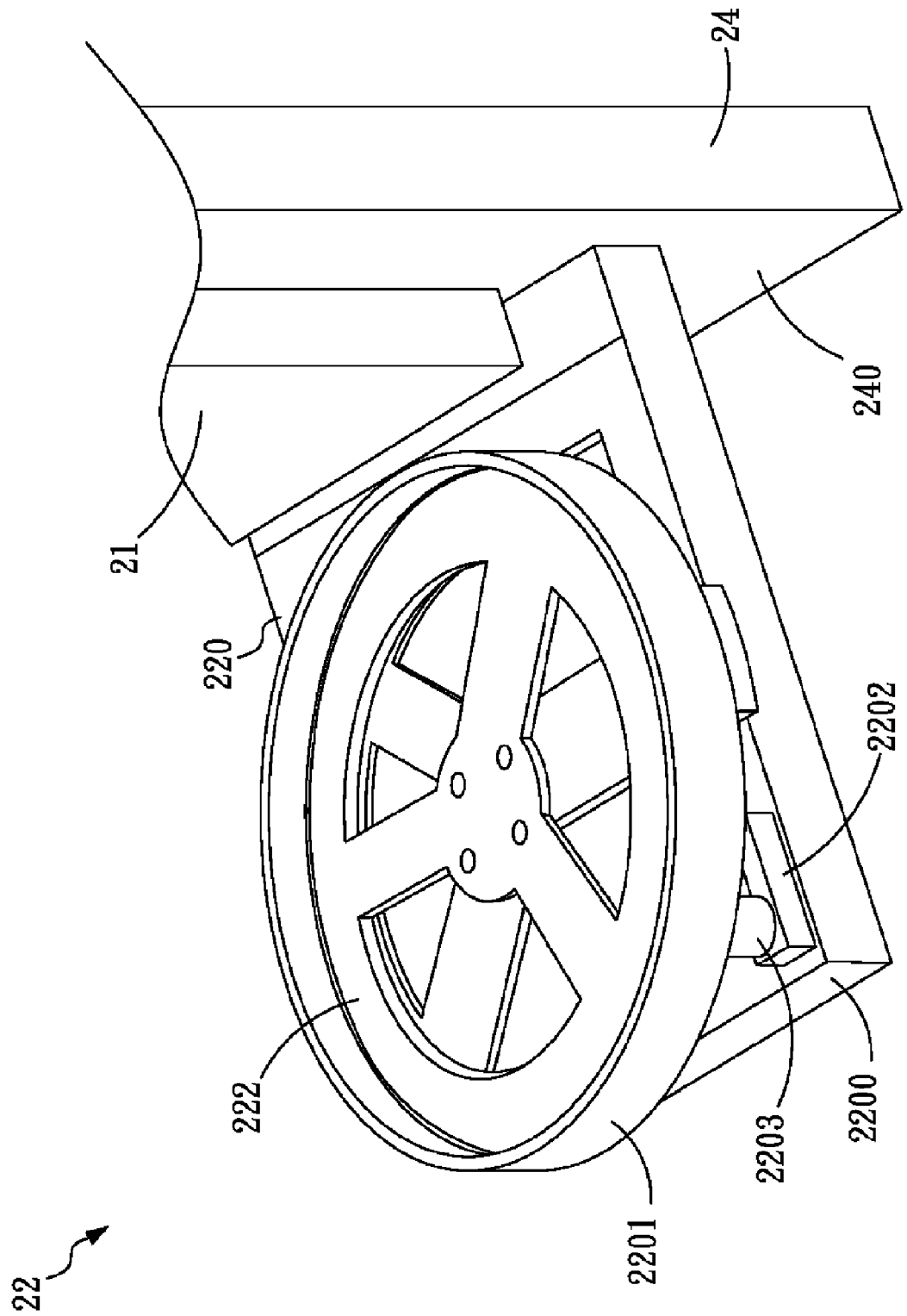
FIG. 4 is a schematic three-dimensional view of a rotation unit according to the present invention.
Figure 5:
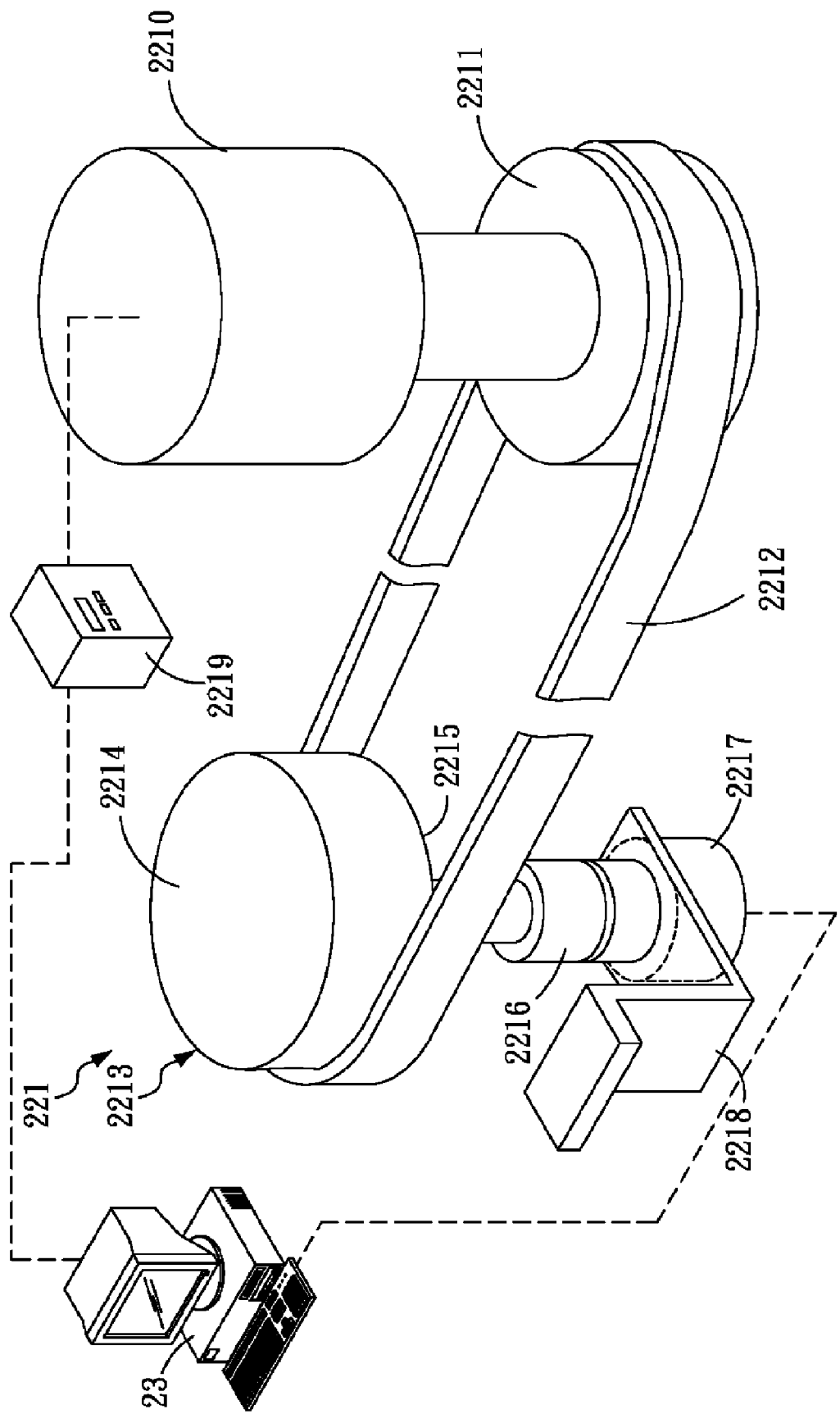
FIG. 5 is a schematic three-dimensional view of a rotation driving device according to an embodiment of the present invention.

FIGS. 2, 4, and 5 are schematic views of the rotation unit according to the embodiment of the present invention. The rotation unit 22 is disposed at a wall 240 on a side of the shielding gate 24 corresponding to the opening 200, and used for supporting the sample 90.

In this embodiment, the rotation unit 22 has a seat 220, a rotation driving device 221, and a support disk 222. The seat 220 is connected to the shielding gate 24. In this embodiment, the seat 220 is formed by a base 2200 and an accommodating stage 2201. One end of the base 2200 is connected to the shielding gate 24. The accommodating stage 2201 is disposed on the base 2200, and used for accommodating the support disk 222. In this embodiment, the sample 90 supported by the rotation unit 22 is a cylindrical container, which may be used for accommodating various forms of nuclear wastes or objects affected by nuclear contamination.

Figure 6:
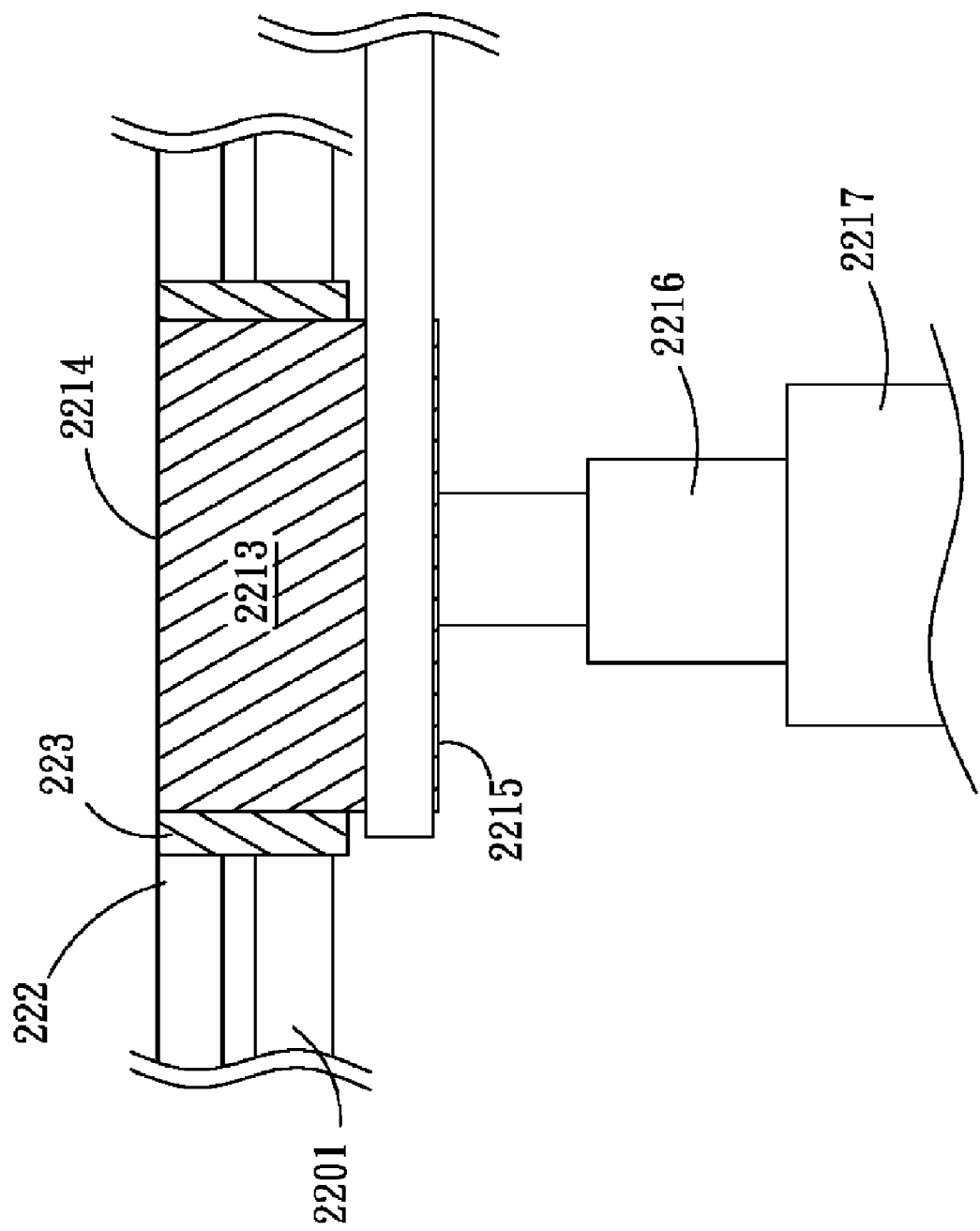
FIG. 6 is a schematic view of relations between a rotating shaft, a support stage, and an accommodating stage according to the present invention.

The rotation driving device 221 is disposed on the seat 220, and used for providing a rotation driving force. In this embodiment, the rotation driving device 221 includes a driving unit 2210, a driven unit 2211, a transmission unit 2212, and a rotating shaft 2213. The driving unit 2210 is a motor, and used for providing a rotation driving force. The driven unit 2211 is coupled to the driving unit 2210, and used for receiving the rotation driving force generated by the driving unit 2210. The transmission unit 2212 is respectively coupled to the driven unit 2211 and the rotating shaft 2213, so as to transfer the rotation driving force to the rotating shaft 2213. Generally, the transmission unit 2212 is, but not limited to, a V-shaped belt, a timing belt, or a chain. Referring to FIG. 6, a bearing 223 is connected to the support disk 222 and the accommodating stage 2201. One end 2214 of the rotating shaft 2213 is connected to the bearing 223, so as to drive the support disk 222 to rotate. An other end 2215 of the rotating shaft 2213 is connected to a coupling 2216. One end of the coupling 2216 is connected to an encoder 2217. The encoder 2217 is used for recording a rotation angle of the support disk 222, converting the angle into an electrical signal, and transmitting the signal to the control unit 23. In this embodiment, positioning points are disposed within a range of 0° to 360° of the rotation angles of the rotation unit 22, the angles can be learned in real time through the encoder 2217, and the rotation angles of the rotation unit 22 are returned to the control unit 23, so that the control unit 23 is enabled to control the rotation angle of the support disk 222. Referring to FIG. 5, in order to fix the encoder 2217, the encoder 2217 is further connected to a support frame 2218. One end of the support frame 2218 is connected to the accommodating stage 2201.

As the weight of the sample may reach 450 kg, if a single rotation speed is merely used to start or end the rotation, shake and shift may easily occur to the sample, and the angle positioning and labeling functions will be disabled. Moreover, a liquid is usually loaded in the sample, and if the sample shakes violently, the radioactive liquid may easily overflow, so that the measuring system and the operating personnel may be exposed to radioactive contamination, and what's worse, the set of equipment may even be damaged and cannot be used any more. Therefore, the rotation driving device 221 further includes a rotation speed frequency conversion controller 2219, which is electrically connected to the driving unit 2210 and the control unit 23 respectively. A monitoring host (a terminal computer connected to the control unit) may actively change the frequency of the frequency conversion controller 2219 at any time according to measuring requirements of the sample, so as to change the rotation speed (rpm) of the sample. In this embodiment, the frequency conversion controller 2219 may receive a control signal sent by the control unit to control the rotation speed and phase of the driving unit 2210. The phase control may result in an effect of forward rotation or reverse rotation, and the information of the rotation angle is transmitted by the encoder 2217 to a PLC controller in the control unit 23. After a processing operation is implemented, the control unit 23 may determine whether to change the rotation speed according to a state of the rotation speed. If it is determined that the rotation speed needs to be changed, the PLC controller further transmits the control signal to the frequency conversion controller 2219, and thus the driving unit 2210 is again under control.

Moreover, due to the presence of the frequency conversion controller 2219, the rotation speed for starting or stopping the rotation of the sample may be effectively controlled. When the rotation of the sample is started, a low rotation speed is required, and a high torque reduction gear is also provided to raise the torque for starting the rotation, and reduce the displacement of the sample away from the support disk due to shake and fast rotation. When the rotation of the sample is to be stopped, the rotation speed is gradually lowered to make the sample stop stably. The phase control between the frequency conversion controller 2219 and the rotation driving device 221 enables the support stage to rotate forwardly or reversely at different speeds, thereby facilitating the rapid positioning and labeling within the range of 0° to 360°. Referring to FIG. 7, due to the forward and reverse rotation mechanism of the rotation unit 22, the sample may select the shortest path to return to the initial point. For example, if the sample rotates forwardly by 90° to a point A, the sample may rotate reversely by 90° to an initial point O. Also, if the sample rotates reversely by 45° to a point B, the sample may rotate forwardly by 45° to the initial point.

Again referring to FIG. 4, in order to measure the weight of the sample (cylindrical container) placed on the support disk, a plurality of weight sensing units 2202 is further disposed on the base 2200, and used for sensing the weight of the sample 90. The weight sensing units 2202 are electrically connected to the control unit 23, and are disposed at positions depending on actual requirements, which are not limited to the embodiment of the present invention. Since the sample 90 is placed on the support disk 222, and the support disk is connected to the accommodating stage 2201 via the bearing 223, the weight of the sample is transferred to the accommodating stage 2201. The support disk 222 and the accommodating stage 2201 both have a three-fold hollow-out design, so as to effectively support the sample, and prevent the detectors below the sample from being blocked, thereby improving the detecting efficiency (cps/Bq). Further, the accommodating stage 2201 has posts 2203 at positions corresponding to the weight sensing units, and the posts 2203 are in contact with the weight sensing units 2202. Therefore, when the sample 90 is placed on the support disk 222, the weight of the sample 90 is transferred to the weight sensing units 2202 via the posts 2203, and is thus measured. The weight sensing units 2202 convert the weight of the sample 90 into electrical signals, and transmit the signals to the control unit 23, which facilitates the monitoring of the weight of the sample 90, and serves as a basis for controlling the rotation of the rotation unit 22.

Again referring to FIG. 2, the control unit 23 is electrically connected to the rotation unit 22 and the plurality of radioactive counters 21. The control unit 23 controls the rotation unit 22 to rotate by a control signal, so as to enable the sample 90 to rotate within the accommodating space. The rotation unit 22 capable of rotating the sample 90 may be set to rotate the sample 90 during the measurement, and the plurality of radioactive counters 21 measures the radioactive counting associated with the sample 90, and transmits signals to the control unit 23 for further calculation, thus obtaining the information of the radioactive source dose and providing a basis for determining the accurate position of the radioactive source. The control unit 23 may simultaneously record the angle returned by the encoder and the detected information of the radioactive dose into a database, for subsequent hot spot determination and precise overall activity distribution analysis. Moreover, as the position of the radioactive source in the sample 90 is already known, the control unit 23 may control the rotation unit 22 to rotate after the measurement is completed, and rotate the position of the radioactive source with the highest intensity in the sample 90 to a specific position (for example, a position close to the opening position of the shielding gate 24), so as to facilitate the recognition and labeling of the operating personnel after the shielding gate 24 is opened, thereby achieving the purpose of rapid measurement and categorization and realizing the measurement of wastes at a high weight. In addition, the mechanism of the present invention may be integrated with the conventional automatic transmission mechanism, and the integrated measuring mechanism with automatic gate opening/closing and rotating functions can be used to improve the measuring efficiency and accuracy.

The above descriptions are merely preferred embodiments of the present invention, but are not intended to limit the present invention. Any modification, equivalent replacement, or improvement made without departing from the spirit and principle of the present invention shall fall within the scope of the present invention.

In view of the above, the radioactivity measuring apparatus with a rotating stage for waste drums provided by the present invention has advantages of improving the measuring security, shortening the measuring time, and enhancing the measuring accuracy. Therefore, the provided apparatus meets the requirements in the industry, improves the industrial competitiveness, and satisfies the requirements for invention application set force in Patent Act. As such, the application for the invention patent is filed according to the law. We will be most grateful if the examiner spends time making examination and grants the patent.

What is claimed is:

1. A radioactivity measuring apparatus with a rotating stage for waste drums, comprising:
   a case, having an opening and an accommodating space in communication with the opening, wherein a shielding gate is connected to one side of the opening;
   a plurality of radioactive counters, disposed in the accommodating space, and used for detecting a radioactive counting associated with a sample;
   a rotation unit, disposed at a wall on a side of the shielding gate corresponding to the opening, and used for supporting the sample; and
   a control unit, electrically connected to the rotation unit and the plurality of radioactive counters, and used for controlling the rotation unit to rotate by a control signal, so as to enable the sample to rotate within the accommodating space.

2. The radioactivity measuring apparatus with a rotating stage for waste drums according to claim 1, wherein the radioactive counter is a plastic scintillation crystal counter.

3. The radioactivity measuring apparatus with a rotating stage for waste drums according to claim 1, wherein the rotation unit further comprises:
   a seat, connected to the shielding gate;
   a rotation driving device, disposed on the seat, and used for providing a rotation driving force; and
   a support disk, coupled to the rotation driving device via a rotating shaft, and used for supporting the sample and rotating under the rotation driving force.

4. The radioactivity measuring apparatus with a rotating stage for waste drums according to claim 3, wherein the support disk further comprises a weight sensing unit, electrically connected to the control unit, and used for detecting a weight of the sample.

5. The radioactivity measuring apparatus with a rotating stage for waste drums according to claim 4, wherein the rotating shaft is further connected to an encoder via a coupling, and the encoder is used for recording a rotation angle of the support disk.

6. The radioactivity measuring apparatus with a rotating stage for waste drums according to claim 1, wherein the plurality of radioactive counters is disposed on an internal wall of the case.

7. The radioactivity measuring apparatus with a rotating stage for waste drums according to claim 1, further comprising: a frequency conversion controller, electrically connected to the control unit and the rotation unit, and used for providing rotation speed control of starting or stopping the rotation unit.

8. The radioactivity measuring apparatus with a rotating stage for waste drums according to claim 7, wherein the frequency conversion controller is further used for controlling a rotation phase of the rotation unit so as to control the rotation unit to rotate forwardly or reversely.

* * * * *